United States Patent
Eikmeier et al.

(10) Patent No.: US 7,240,873 B2
(45) Date of Patent: *Jul. 10, 2007

(54) MACHINE-DETECTABLE ADHESIVE TAPE

(75) Inventors: Markus Eikmeier, Lensahn (DE);
Bernhard Gebbeken, Hamburg (DE);
Thomas Gassner, Heidgraben (DE);
Christoph Nagel, Hamburg (DE); Axel Burmeister, Buchholz (DE)

(73) Assignee: tesa AG, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/487,848

(22) PCT Filed: Aug. 29, 2001

(86) PCT No.: PCT/EP01/09965

§ 371 (c)(1),
(2), (4) Date: Aug. 25, 2004

(87) PCT Pub. No.: WO03/018453

PCT Pub. Date: Mar. 6, 2003

(65) Prior Publication Data

US 2004/0256514 A1    Dec. 23, 2004

(51) Int. Cl.
*B65H 19/18* (2006.01)
(52) U.S. Cl. .............. 242/555.3; 242/556.1; 242/563
(58) Field of Classification Search .......... 242/555.3, 242/556, 556.1, 551, 555, 555.4, 563
See application file for complete search history.

(56) References Cited

U.S. PATENT DOCUMENTS 3,967,994 A * 7/1976 Langberg ............... 156/64
5,901,919 A * 5/1999 Wienberg ............... 242/556.1
6,140,146 A * 10/2000 Brady et al. ............. 438/62

FOREIGN PATENT DOCUMENTS

| DE | 196 28 317 A1 | 1/1998 |
|---|---|---|
| DE | 198 30 673 A1 | 1/2000 |
| DE | 198 30 674 A1 | 1/2000 |
| DE | 198 37 689 | 2/2000 |
| DE | 198 41 609 A1 | 3/2000 |
| DE | 199 02 179 A1 | 8/2000 |
| EP | 0 418 527 A2 | 3/1991 |
| EP | 0 757 657 B1 | 1/1998 |
| EP | 0 970 905 A1 | 1/2000 |
| EP | 1 022 245 A2 | 7/2000 |
| FR | 2 769 109 | 4/1999 |
| WO | WO 94/11846 | 5/1994 |

OTHER PUBLICATIONS

WO 03/01854 A1 Jun. 3, 2003.
WO 03/018452 A1 Jun. 3, 2003.
WO 03/018451 A1 Jun. 3, 2003.

* cited by examiner

*Primary Examiner*—Patrick Mackey
*Assistant Examiner*—William E. Dondero
(74) *Attorney, Agent, or Firm*—Norris McLaughlin & Marcus

(57) ABSTRACT

An adhesive tape for a flying reel change of a flat material wound up over a reel, provided with at least one detachable adhesive system. The adhesive tape is provided with at least one transponder which can be detected by means of a detector.

4 Claims, 3 Drawing Sheets

MACHINE-DETECTABLE ADHESIVE TAPE

This application is a 371 of PCT/EP01/09965, filed Aug. 29, 2001.

The invention relates to an adhesive tape for a flying reel change of flat web material wound up on reels, equipped with at least one cleavable adhesive system, and to a splicing method for the flying reel change of flat web material wound up on reels.

The flying reel change is a familiar method in paper mills or the like of replacing an old paper reel which has virtually been unwound by a new one without having to stop the high-speed machines. The end of the old paper web is in this case adhesively bonded to the start of the new paper web, in order to ensure operation which is as continuous as possible. For this purpose, use is made of double-sided self-adhesive tapes, that are known as tabs, which are firstly highly adhesive and tacky but secondly, on account of their water-soluble self-adhesive compounds and paper carriers, are not disruptive when the paper waste is reused in the papermaking machine. Classically, the tabs are stuck to the web start manually; this process requires the use of specialist personnel and leads to results which are technically not advantageous, since the adhesions are relatively thick as a result of the sequence of paper webs and adhesive strips. Diverse products can be obtained for the adhesion during a flying reel change, in particular those which, in addition to a paper carrier, have a water-soluble self-adhesive compound coated on both sides.

EP 418 527 A2 discloses a method of preparing a printing material web reel in a reel changer of a rotary press, in which adhesive strips are used which are subdivided into three zones (column 3, line 12 ff. and FIGS. 1 and 2), the central zone 6 being perforated. Tearing then takes place at this perforation.

However, in practice adhesive tapes of this type have serious disadvantages, in particular as a result of the adhesive areas which are present after the splice.

However, DE 196 28 317 A1 has also already disclosed adhesive tape for such applications in which, after the splice has been carried out, adhesive areas no longer occur, use being made there of a cleavable paper carrier, which cleaves during the splice and, after the splice has been carried out, covers the adhesive compounds. DE 196 32 689 A1 also discloses a similar adhesive tape for this application, but here a cleavable paper carrier is used, which cleaves over the entire width of the adhesive tape.

The non-adhesive covering of adhesive regions which are otherwise open is disclosed by DE 196 32 689 A2. Here, an adhesive tape for dynamic loadings during the splicing process is described, whose paper carrier cleaves and covers the adhesive compounds with its residues.

DE 198 30 673 shows an adhesive tape for the flying reel change in paper conversion machines or the like, which has a paper carrier coated on both sides with a water-soluble self-adhesive compound. An edge region of the rear of the adhesive tape is equipped with a single-sided adhesive tape which, for its part, has a cleavable paper carrier.

A further variant is described in DE 198 30 674. Here, an adhesive tape with two cleaving strips is illustrated.

DE 199 02 179 A2 also shows an adhesive tape for a splicing method. On its non-adhesive rear, this adhesive tape bears a double-sided adhesive tape which has a cleavable paper carrier, cleaves during the splicing method and covers the respective adhesives. In order to avoid tears during the flying reel change, the laminated adhesive tape with a paper carrier of cleavable paper is arranged to be moved in, specifically at a certain distance from the longitudinal edge of the adhesive tape.

It is an object of the invention to provide an adhesive tape and a splicing method which does not exhibit the disadvantages of the prior art, or only to a reduced extent, and which permits automated control of the splicing method.

This object is achieved in a manner that is surprising and cannot be foreseen by those skilled in the art by an adhesive tape and by a method as described herein.

In accordance with that stated above, the present invention relates to an adhesive tape for the flying reel change of flat web material wound up on reels, the adhesive tape having at least one cleavable system. According to the invention, this adhesive tape is equipped with at least one transponder that can be detected by means of a detector.

The invention therefore provides an adhesive tape which has integrated in it the function of the signal label otherwise stuck on later.

Transponders are microelectronic circuits. They offer the advantage of being self-contained and have a high resistance to disruptive influences such as temperature, pressure, impacts, chemicals, humidity and the like. They therefore offer great advantages for the application in paper processing installations, where they exhibit great reliability in their function even during machine processing of the paper provided with the transponder system.

Use is very advantageously made of an adhesive tape which has at least one main carrier with at least one layer of a self-adhesive compound on the top. On the bottom of the adhesive tape there is the cleavable system, preferably in the form of a strip, which is likewise equipped to be self-adhesive on the open side. During the splice, this cleavable system cleaves in such a way that no adhesive residues remain and hamper the passage of the splice through the machine.

For the structure of the label according to the invention, in principle use can be made of all adhesive tapes which can be used for the flying reel change ("Easy Splice"). For example, reference should be made here to DE 196 28 317 A1, (DE 196 32 689 A1), DE 198 30 673 A1, DE 198 30 674 A1, DE 198 41 609 A1, DE 199 02 179 A1, EP 0 757 657 B1.

In a preferred expansion of the invention, the main carrier of the adhesive tape is equipped in such a way that it is used for the machine detection and is thus equipped with the transponder. In this case, the transponder can advantageously be incorporated in the carrier material.

In a further embodiment of the inventive adhesive tape, the transponder is located in an additional layer in the adhesive tape.

Thin-layer transponders are particularly preferably suitable as transponders for the inventive adhesive tape. Corresponding reading antennas can be used as detectors.

The inventive adhesive tape is detected during the acceleration of the paper reel and thus triggers the splicing operation at the correct time, in addition the transponder is detected or read in what is known as the reject diverter, in which that quantity of paper which contains the splice is sorted out. The inventive adhesive tape thus performs functions which have previously been provided by additional labels or markings and offers additional advantages for the processing process. The labels previously used cause sources of error, since the signal generator and the adhesive splice tape have to be adjusted accurately to each other.

In previous methods, the detection is ensured as standard by an aluminized label. In this case, there is the danger that the label will be wrongly positioned, as a result of which several problems can occur.

Firstly, the label can be stuck outside the detection field of the detector. In this case, the reel changer does not detect the splice and the reel change does not take place, that is to say the machine has to be stopped, the paper has to be threaded manually into the press.

Secondly, the distance between splice and aluminized label must be defined accurately and also maintained accurately. If these distances do not agree, the old paper web will be cut off either too early or too late. In the event that it is cut off too early, it can occur, that the adhesion between the new reel and the web running out has not yet taken place adequately, and a break then occurs, which also results in machine stoppages again. If the old web is cut off too late, the projecting paper residue, what is known as the flag, is lengthened. Too long a flag can project out of the paper web in the further processing process, such as the printing, and can become caught on deflection rollers or in the printing unit and thus lead to disruption or breaks.

Thus, firstly inaccuracies in the sticking lead to a disrupted function, secondly malfunctions are based on the fact that the signal label falls off or "slips" on the reel. Furthermore, the signal label provides an additional adhesive bond at which, in the event of partial separation of the label, adhesive areas can be exposed in an uncontrolled manner and disrupt the paper processing process, for example stick the paper together in an uncontrolled manner.

As a result of the integration of the switching function directly into the adhesive splicing tape, the splicing reliability could be increased considerably as compared with the previous procedure, substantially fewer malfunctions were established.

An additional advantage of the invention is that information can be passed on to the process control via the adhesive splicing tape without contact, for example information about the current rotational speed of the new reel. The invention therefore also permits, in the event of malfunctions of the apparatus, for example a new reel that is not running correctly (wrong speed, imbalance or the like), the initiation of an emergency stop or introduction of other measures to correct the error.

In addition to the actual detection action, additional information can be transmitted, for example information about the type or web thickness of the new reel. For example, when reels of different type or composition are used, the processing installation can automatically be adjusted to the new processing conditions without requiring any further external control. This further results in the advantage that, as early as the preliminary stage of the actual processing, further processes can be controlled by means of automatic detection of the reels prepared in this way, for example the storage and the stock-keeping, the paper preparation or the like.

The transponders used can be passive and active transponders. The latter offer the advantage that they can record information before or during the paper processing process and thus permit "dynamic" monitoring and control. For this purpose, instead of the simple reading detector, a reading and writing antenna is used.

The main carrier used is preferably a tear-resistant paper or film carrier. The following carrier materials may be listed here by way of example: slightly creped papers, machine-glazed body papers, one-sided coated smooth body papers, two-sided coated, compacted, printable decorative papers, single-sided double (twofold) coated, woodfree, highly glossy kraft papers, without wishing to restrict the selection of the carrier materials unnecessarily by these examples.

It should be pointed out that cleavable adhesive tapes in the sense of DE 196 32 689 A1, in which the (main) carrier of the adhesive tape itself cleaves, can also be used. In this case, the cleavable carrier should then be configured to be detectable in accordance with that stated further above.

Use is advantageously made of a cleavable system which has a considerably lower cleavage strength than a paper carrier which has to absorb tensile forces. The cleavable system or systems are preferably based on sized highly consolidated paper, on, a composite of paper and film or on a composite of two films, it being possible for the composite to consist of papers and/or films connected in a defined point-like and/or linear manner. For this purpose, for example, the following papers, paper composite systems or films are particularly suitable:

easily cleavable paper systems, for example non wet-strength papers duplex papers (papers laminated together in a defined manner, the cleaving operation proceeds extremely homogeneously; no stress peaks arise, for example as a result of inhomogeneous compaction. These papers are used for the production of wallpapers and filters.)

highly consolidated papers glued together in a defined manner (papers with a high cleavage strength).

The glueing can be carried out, for example, with starch, starch-containing derivatives, wallpaper pastes based on methyl cellulose (tesa® paste, tesa AG, Hamburg; Methylan®, Henkel KgaA, Düsseldorf) or polyvinyl alcohol derivatives.

Such systems are described, for example, in EP 0 757 657 A1.

cleavable systems in which the cleavage forces are determined by the size of the adhesion points;

such systems are described, for example, in DE 198 41 609 A1.

coextruded films.

It is particularly advantageous if the cleavage strength of the cleavable system is 5 to 70 cN/cm, in particular 12 to 60 cN/cm. In relation to cleavage strength and its measurement, reference is made to DE 199 02 179 A1.

In a very advantageous embodiment, the distance (V); of the double-sided adhesive tape (6) from the front edge (longitudinal edge 14) of the main carrier is up to 15 mm, in particular 0.5 to 15 mm, preferably 1 to 7 mm, very preferably 1.5 to 3.5 mm.

If a plurality of cleavable systems is applied to the adhesive tape, then the distance of the cleavable systems from one another is advantageously 3 to 50 mm. Distances of 25 to 45 mm, quite particularly distances of 30 to 40 mm, are selected.

The cleavable system or systems advantageously have the same width as the main carrier. In a further beneficial embodiment, on the other hand, it is advantageous if the main carrier is wider than the cleavable system.

The width of the cleavable system is preferably 3 to 40 mm, in particular 6 to 12 mm.

The amount by which the cleavable material is advantageously moved in (distance V) in the region of the front longitudinal edge 14 is up to 15 mm, in particular 0.5 to 15 mm, preferably 1 to 7 mm, very preferably 1.5 to 3.5 mm.

In the case of a plurality of cleavable systems on the adhesive tape, these can consist of the same material and thus exhibit the same cleavage forces, but it can also be advantageous to provide the cleavable systems from different material, so that these possess different cleavage forces.

In a very preferred embodiment of the invention, the self-adhesive compound used (in the sense of the self-adhesive compound corresponding to item numbers 3, 8 and/or 9 of the figures) is an acrylic contact adhesive compound. Both water-soluble and water-insoluble acrylics can advantageously be used.

Furthermore, natural and synthetic rubber compounds and also dispersions of the abovedescribed compounds can also be used. It should be pointed out that, in principle, all basic types of contact adhesive compounds which meet the criteria according to the invention can be used.

In a further preferred embodiment, the self-adhesive compound is provided with a covering which, if appropriate, is provided with a perforation or a slit in the longitudinal direction. The slit can preferably be provided at a distance A of 20 to 40 mm from the longitudinal edge 15 of the adhesive tape which is opposite the front longitudinal edge 14, in the vicinity of which the cleavable system 6 is arranged.

The adhesive tape is employed in reel changers and reject diverters in which the splice detection is carried out without contacts. The adhesive tape is preferably employed in methods as described in more detail in the following text.

The invention relates further to a splicing method for the flying reel change of flat web material wound up on reels, in which the uppermost paper web of a new reel is fixed to the web lying underneath with an adhesive tape, which is equipped with at least one main carrier, at least one layer of a self-adhesive compound on the top and at least one cleavable system on the bottom, and part of the self-adhesive compound which is needed for the splicing process is exposed, whereupon the new reel equipped in this way is placed beside an old reel which has been unwound virtually completely and is to be replaced, and is accelerated to substantially the same rotational speed as the latter, is then pressed against the old web, the exposed self-adhesive compound of the adhesive tape bonding adhesively to the old web at substantially the same speeds of the webs, while at the same time the cleavable system cleaves in such a way that, following the cleaving operation, no adhesive regions are exposed, and the time of the splicing operation being determined by a detector and, in particular, the adhesive tape or at least a part thereof having a transponder which is detected mechanically by the detector.

In a further development of the inventive method, the adhesive tape is stuck at right angles to the moving paper web. In advantageous variants of the inventive method, adhesive bonding of the adhesive tape can also be carried out at an acute angle of up to 30° with respect to the moving paper web, in particular of up to 10°.

In the splicing method, an adhesive tape is stuck to a new paper reel in a straight line under the uppermost web, so that part of the adhesive tape remains free, while the underside of the adhesive tape sticks to the web lying underneath and therefore secures the uppermost web, if appropriate, initially only part of the covering possibly located on the self-adhesive compound having been pulled off, so that the part of the self-adhesive compound which is needed for the splicing method is still covered by the covering and, in this state, the reel has no free adhesive surface, following which, for the final preparation for the splicing method, the remaining covering which may possibly still be present is removed, whereupon the new reel equipped in this way is placed beside an old reel which has been unwound virtually completely and is to be replaced, and is accelerated to the same rotational speed as the latter, is then pressed against the old web, the exposed self-adhesive compound of the adhesive tape bonding to the old web at substantially the same speeds of the webs, while at the same time the cleavable carrier of cleavable material cleaves and, with its residues, covers both self-adhesive compounds which had been coated onto it, in a non-adhesive manner.

Following the contact between the adhesive tape and the web running out, cleavage of the cleavable system on the adhesive tape therefore occurs, so that the uppermost paper layer of the new bale is released and no more adhesive residues are present in exposed form.

BRIEF DESCRIPTION OF THE DRAWINGS

In the following text, the invention is to be described in more detail using an exemplary embodiment, but without wishing to restrict it unnecessarily thereby. In the drawing:

In detail, FIG. 1 shows an adhesive tape 1 with a main carrier 2, coated on one side with a water-soluble self-adhesive compound 3. The main carrier 2 consists of slightly creped paper in which a transponder T is integrated. The total thickness of the main carrier 2 with self-adhesive compound 3 is 0.088 mm, the width 150 mm.

Figure 1:
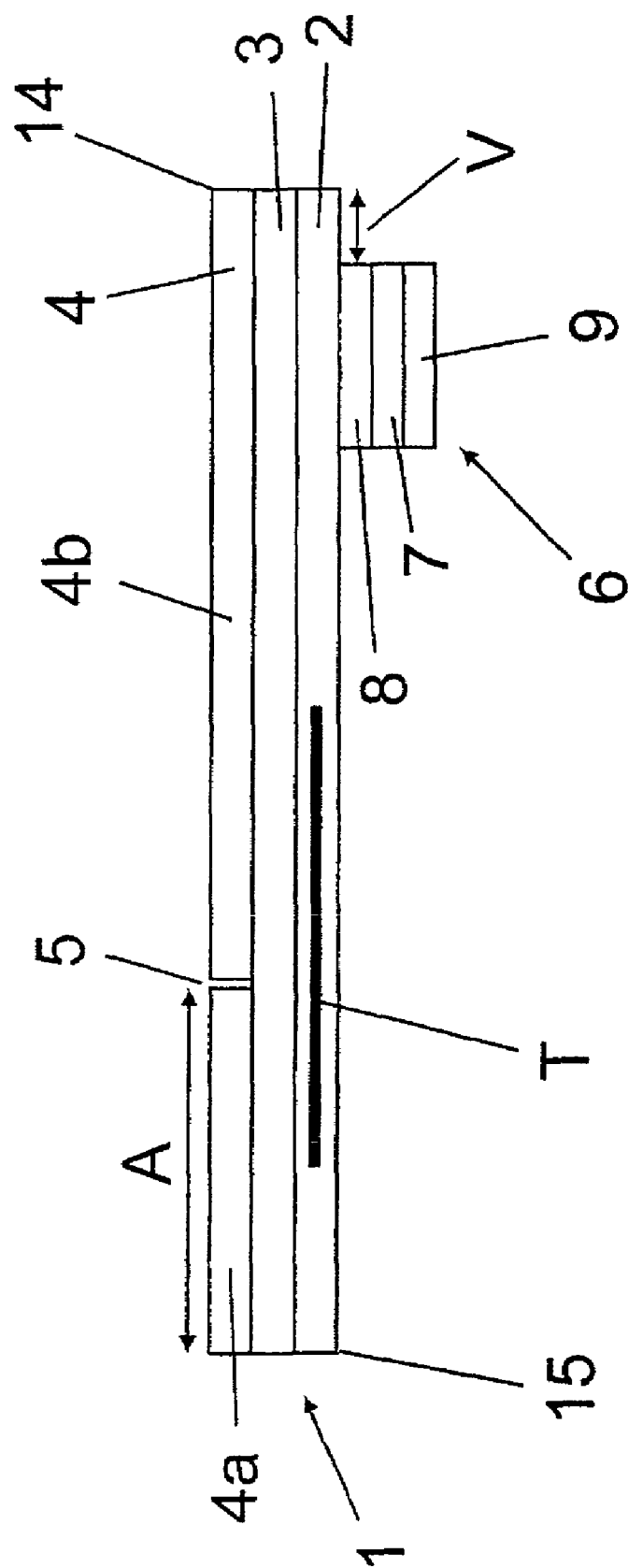
FIG. 1 shows a lateral schematic view of an inventive adhesive tape with with a transponder

The self-adhesive compound 3 is covered with a siliconized release paper 4 which, at a distance of 30 mm from the left-hand edge, is provided with a slit 5, so that the left-hand part 4a of the release paper 4 can be removed first of all, and then the right-hand part 4b. In the region of the right-hand end of the adhesive tape 1, a strip of a double-sided adhesive tape 6 is stuck underneath, consisting of a paper carrier 7 of cleavable paper coated on both sides with water-soluble self-adhesive compound 8 and 9. The adhesive tape has a width of 9 mm.

Figure 2:
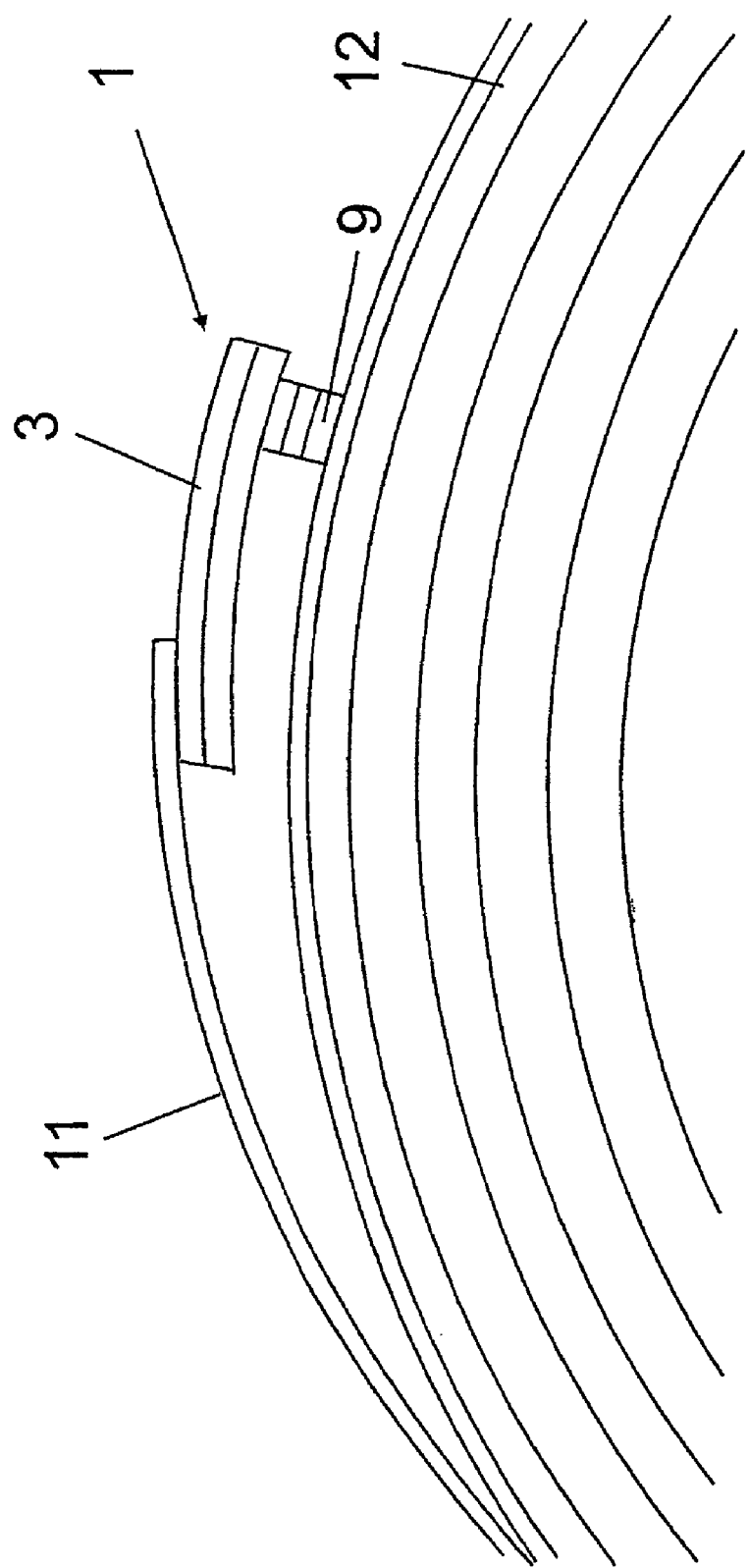
FIG. 2 shows a lateral schematic view of an adhesive tape according to FIG. 1, bonded to a paper reel and ready for the flying reel change

FIG. 2 illustrates how such an adhesive tape 1 is stuck under a paper web 11 of a new paper reel, specifically with the left-hand part, after the part 4a of the release paper 4 has been pulled off the latter. The adhesive tape has previously been stuck with the exposed self-adhesive compound 9 onto the paper web 12 belonging to the paper reel and lying under the paper web 11. The right-hand part 4b of the release paper 4 has also been pulled off, so that the paper reel equipped in this way is ready for a flying reel change, the bonding of the adhesive tape 1 running at right angles over the reel.

The self-adhesive compound 3 is then exposed and, for the flying change, constitutes the contact area with webs that are running out. The contact area has a width of 120 mm and extends over the entire width of the paper reel.

Figure 3:
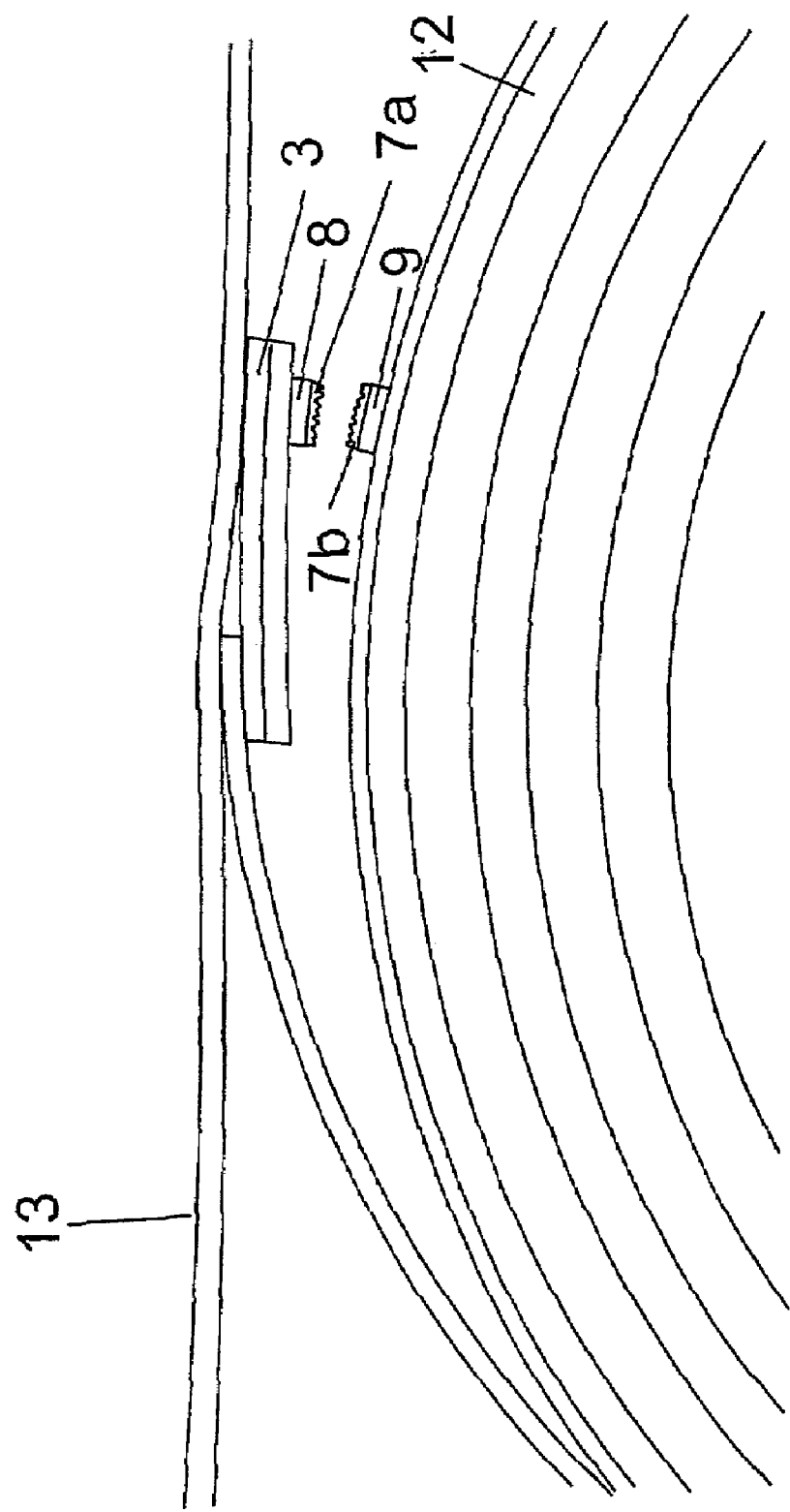
FIG. 3 shows a view according to FIG. 2 but after the flying reel change has been carried out.

The (new) paper reel equipped in this way is brought alongside the unwound (old) paper reel, to which the new is to be attached. The new paper reel is accelerated to a rotational speed which corresponds virtually to the speed of the web running out. Once both speeds have been synchronized adequately, the change can be completed. In the process, the splice is detected by means of a detector, which is located on the reel changer, and the position is located exactly. The web 13 that is running out is brought into contact with the circumference of the new reel by means of a pressure shaft (not illustrated) and the self-adhesive compound 3 is stuck to the paper web 13 that is running out in accordance with FIG. 3. By means of the detector and the signal function of the adhesive tape, the exact time at which the paper web that is running out is pressed against the new paper reel is determined, and cutting off of the old paper web is controlled. Instantaneously after the adhesive contact, the cleavable paper carriers 7 cleave in such a way that one part 7a remains on the adhesive tape 1 and covers the self-adhesive compound 8 there, while the other part 7b remains on the self-adhesive compound 9 which sticks to the paper web 12. Therefore, both self-adhesive compounds 8 and 9 are neutralized to a certain extent, no longer stick and therefore cannot interfere in the further process in the paper processing machines either.

In the further course of the processing process, the region of the paper with the splice is sorted out in order that this does not interfere in the further function of the paper (thus, in printing presses, for example, newspapers with splices are prevented from being marketed). Sorting is carried out at what is known as the reject diverter. Here, too, the splice is detected without contact via the integrated transponder and the appropriate piece of paper is sorted out by machine.

The use of an inventive adhesive tape with integrated switching function ensures stable detection without the application of further labels. It is therefore always ensured that identification of the splice is possible.

The invention claimed is:

1. A splicing method for the flying reel change of flat web material wound up on reels, said method comprising the following steps:
   a) providing an adhesive tape comprising a cleavable adhesive system and a transponder;
   b) adhering an uppermost web of a new reel with the adhesive tape to a web lying underneath said uppermost web;
   c) exposing a portion of said adhesive tape intended to be spliced to an old unwinding reel to be replaced;
   d) placing the new reel beside the old unwinding reel;
   e) accelerating the new reel to a rotational speed that is substantially the same as that of the old unwinding reel;
   f) determining the exact time that the new reel is to be pressed against the old unwinding reel to effect a splice of the new reel to the old unwinding reel by detecting the transponder; and
   g) pressing the rotating new reel against the old unwinding reel at said exact time, wherein the adhesive tape bonds to the old unwinding web to effect the splice, while at the same time the cleavable system cleaves in such a way that no adhesive regions of the cleavable system are exposed afterwards.

2. The method according to claim 1, wherein the adhesive tape comprises a main carrier and the main carrier comprises a transponder.

3. The method according to claim 1, wherein the transponder is a thin-layer transponder.

4. The method according to claim 1, wherein the web material comprises paper.

* * * * *